Nov. 2, 1926.

W. A. OSGOOD ET AL 1,605,274

IRONING MACHINE

Filed Feb. 15, 1922     7 Sheets-Sheet 3

Nov. 2, 1926.

W. A. OSGOOD ET AL 1,605,274

IRONING MACHINE

Filed Feb. 15, 1922     7 Sheets-Sheet 4

Fig. 4.

Patented Nov. 2, 1926.

1,605,274

UNITED STATES PATENT OFFICE.

WATSON A. OSGOOD AND CHARLES W. SWORTFIGUER, OF SYRACUSE, NEW YORK; SAID SWORTFIGUER ASSIGNOR TO SAID OSGOOD.

IRONING MACHINE.

Application filed February 15, 1922. Serial No. 536,651.

This invention has for its object a laundry machine for ironing a wide variety of articles and adapted for general household purposes, which machine is particularly simple and compact in construction, rapid in operation and highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 1 is a side elevation of a machine embodying my invention.

Fig. 1$^a$ is a sectional view on the line 1$^a$—1$^a$ Fig. 1.

Figure 3 is a fragmentary elevation, partly in section, showing the actuating mechanism for the clothes support and the iron.

Figure 3$^a$ is a sectional view on line 3$^a$—3$^a$, Fig. 3.

This ironing machine comprises generally, a frame, a clothes support carried by the frame, an iron reciprocally movable lengthwise of the clothes support, a support or carrier for the iron, actuating means for reciprocating the iron and its support comprising a prime mover, and power transmitting connections between the prime mover and the iron support, these connections including means for varying the length of the throw of the iron, and the iron being preferably shiftable relatively to its support to vary the position of the throw relatively to the clothes support, whereby the iron traverses either the full length of the clothes support or any given part of such length.

The clothes support is preferably a rotatable drum which is actuated by the prime mover and this machine also preferably includes means by which the power transmitting connections to the drum and to the carriage can be connected and disconnected at will independently of each other, and also by means of which pressure is applied to the iron when any one of the power transmitting connections is effectively connected to the prime mover.

1 designates the frame of the machine which may be of any suitable form, size and construction.

2 is a clothes support which is preferably a rotatable drum extending in a general horizontal direction, and connected at its inner end to the frame 1. The drum overhangs, that is, it is supported at one end so that articles of clothing such as skirts can be sleeved over the drum.

3 is a shelf or table carried by the frame for receiving the articles after being ironed. As here illustrated, the drum is mounted to be moved out of its operative position so that other types of clothes supports as a sleeve board, Figs. 14, 15, or a bosom board, Figs. 16 and 17, may be mounted in the position occupied by the drum.

Figures 1, 1A:
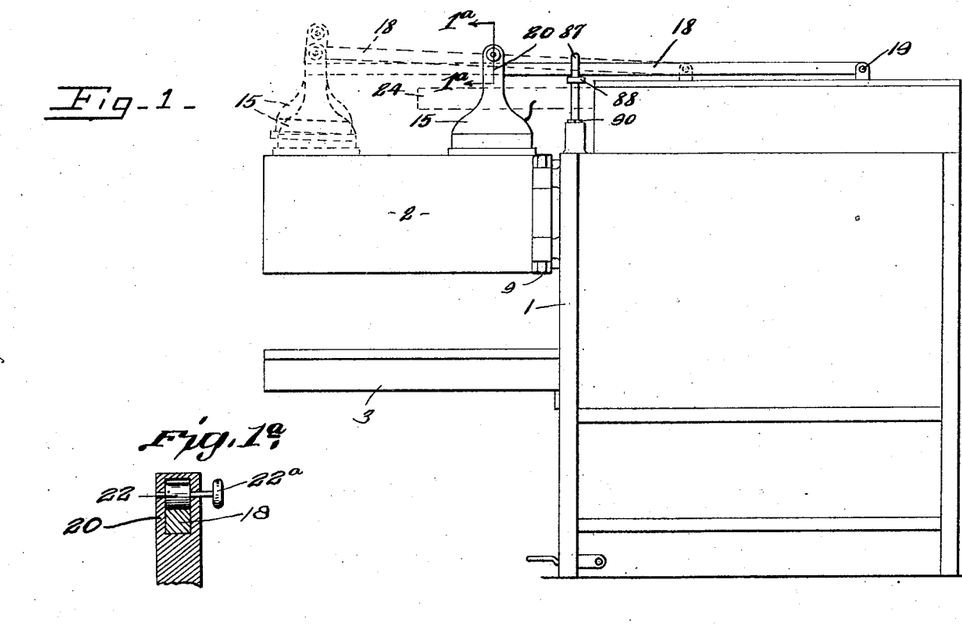
Figure 2:
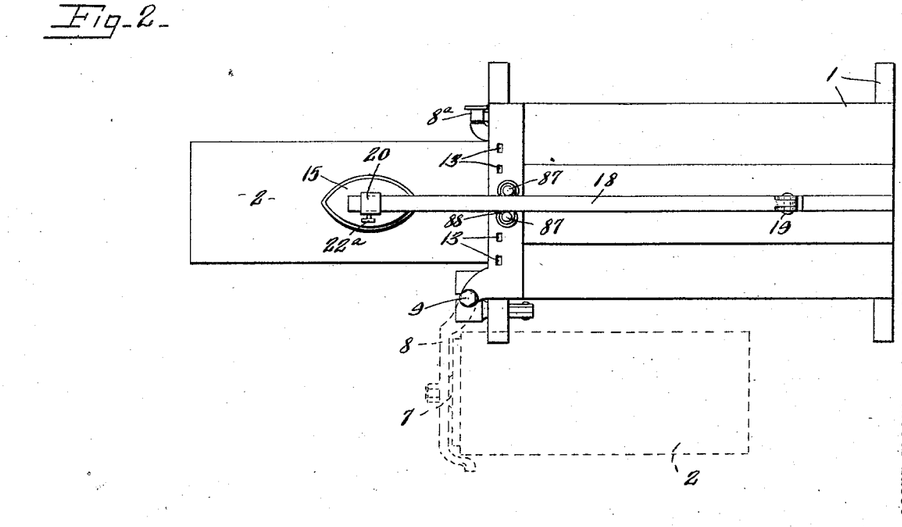
Figure 2 is a plan view thereof.

In the illustrated embodiment of my invention, the drum is mounted upon an axle 6 suitably secured in a bearing 7 formed in the intermediate part of a movable bracket 8 which is here illustrated as pivoted at one end at 9 to the frame and movable on its pivot as indicated in dotted lines, Fig. 2, into a position alongside the frame and out from under the iron so that the boards 4 or 5 can be attached to the frame into the position occupied by the drum. Each of these boards is formed with a vertical portion 10 or 11 at its inner end for shouldering against one end of the frame 1 and with hooks 12, which interlock in slots 13 formed in the upper edge of the front wall 1 of the frame.

Figure 4:
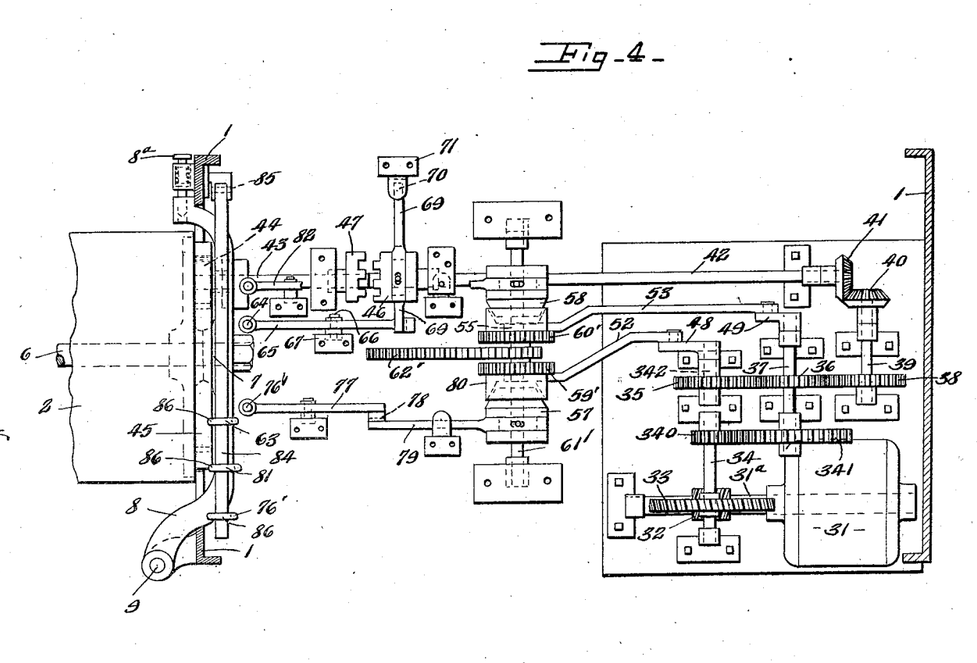
Figure 4 is a plan view of parts seen in Fig. 3.
Figures 7, 12, 13, 14, 15, 16, 17:
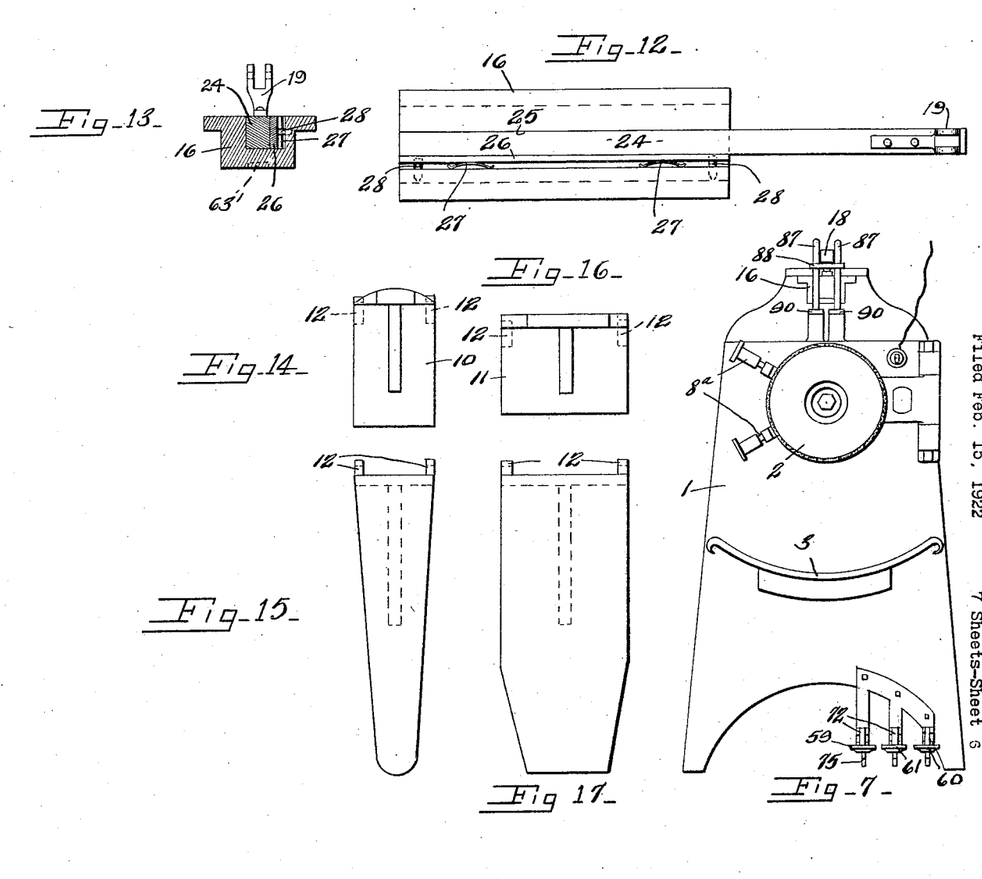
Figure 7 is an elevation looking to the right, Fig. 1.
Figure 12 is an elevation of the carriage and the iron support.
Figure 13 is a sectional view on line 13—13, Fig. 12, showing the means of attaching the iron to its support whereby the iron is shiftable to traverse different portions of the drum.
Figs. 14 and 15 are respectively end elevation, and a plan of one form of clothes support or ironing board, as a sleeve board, which is interchangeable with the drum.
Figs. 16 and 17 are similar views of another form of another ironing board interchangeable with the frame.

The bracket 8 is locked in its normal position by one or more spring pressed catches 8ª, Figs. 4 and 7, carried by lugs on the frame 1 and interlocking with suitable openings in the free end of the bracket, these catches being here shown as spring pressed bolts.

Figures 8, 9, 10, 11:
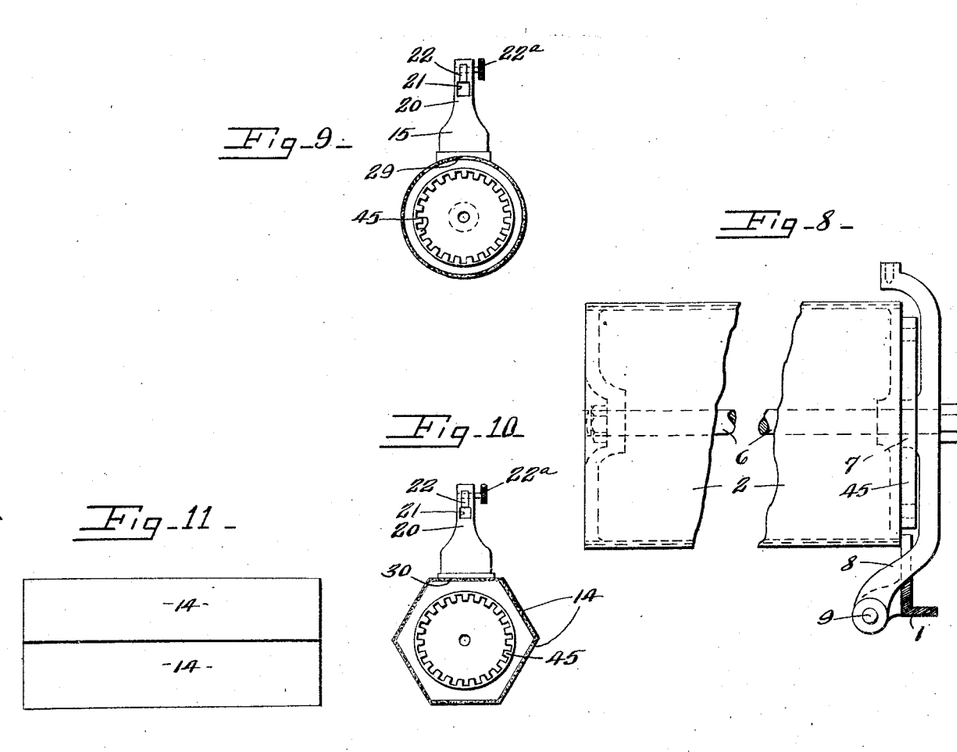
Figure 8 is a fragmentary plan view of the drum and its support.
Figure 9 is an inner end elevation of the drum, the iron having a concave face, being shown.
Figure 10 is an elevation similar to Fig. 9, of a polygonal drum, that is a drum having a plurality of flat faces and an iron having a flat ironing face, being shown.
Figure 11 is an elevation of the drum shown in Fig. 10.

The drum as seen in Figs. 9 and 10 may be either cylindrical or polygonal, that is, provided with a plurality of flat faces 14, as seen in Fig. 10.

15 is a reciprocally movable iron which is usually electrically heated.

This iron is movable by a reciprocating carriage 16 movable in suitable guides 17 in the frame 1 and comprising a support or arm 18 pivoted at 19 thereto and overhanging the clothes support 2.

The iron 15 is secured to the overhanging part of the arm 18 and as here shown, the iron is formed with an upwardly extending bracket 20, Fig. 9, having a passage 21 therethrough through which the arm 18 extends. The bracket is secured to the arm 18 by suitable means as a cam 22, which when turned binds on the rod 18 in the passage 21, the cam having a suitable handle 22ª.

The arm is shiftable relatively to the carriage and as here shown, it is pivoted to a slide 24 arranged in a way or groove 25 in the carriage 16 and is normally held from movement relatively to the carriage 16 by friction means here shown as a shoe or plate 26 located in the groove 25 between the slide 24, and one side of the groove and springs 27 thrusting the plate against the slide 24.

The plate is held in position in the groove by suitable means as pins 28, see Figs. 12 and 13.

During the reciprocations of the carriage 16, the slide 24 and iron support 18 move as a unit therewith, but the support can be shifted relatively to the carriage 16 to change the position of the throw of the iron when the throw of the iron is shortened to a length less than the length of the drum, by taking hold by the bracket 20 of the iron and pulling or pushing on the same, hard enough to move the slide 24 relatively to the carriage 16.

This adjustment of the slide relatively to the carriage can be effected readily and with perfect safety when the machine is in operation as the friction effected by the springs 27 and plate 26 is just sufficient to normally transmit the motion of the carriage 16 to the slide 24, and by a very slight pressure being applied to the rod 18 by the operator, or by holding it from movement momentarily, either on the forward or backward stroke, the iron can be adjusted in either direction.

In the normal operation of the machine, when a cylindrical drum is used, the iron is provided with a concave cylindrical face 29 and when a many sided drum is used, the iron is provided with a flat face 30 as seen in Fig. 10.

Figures 3, 3A:
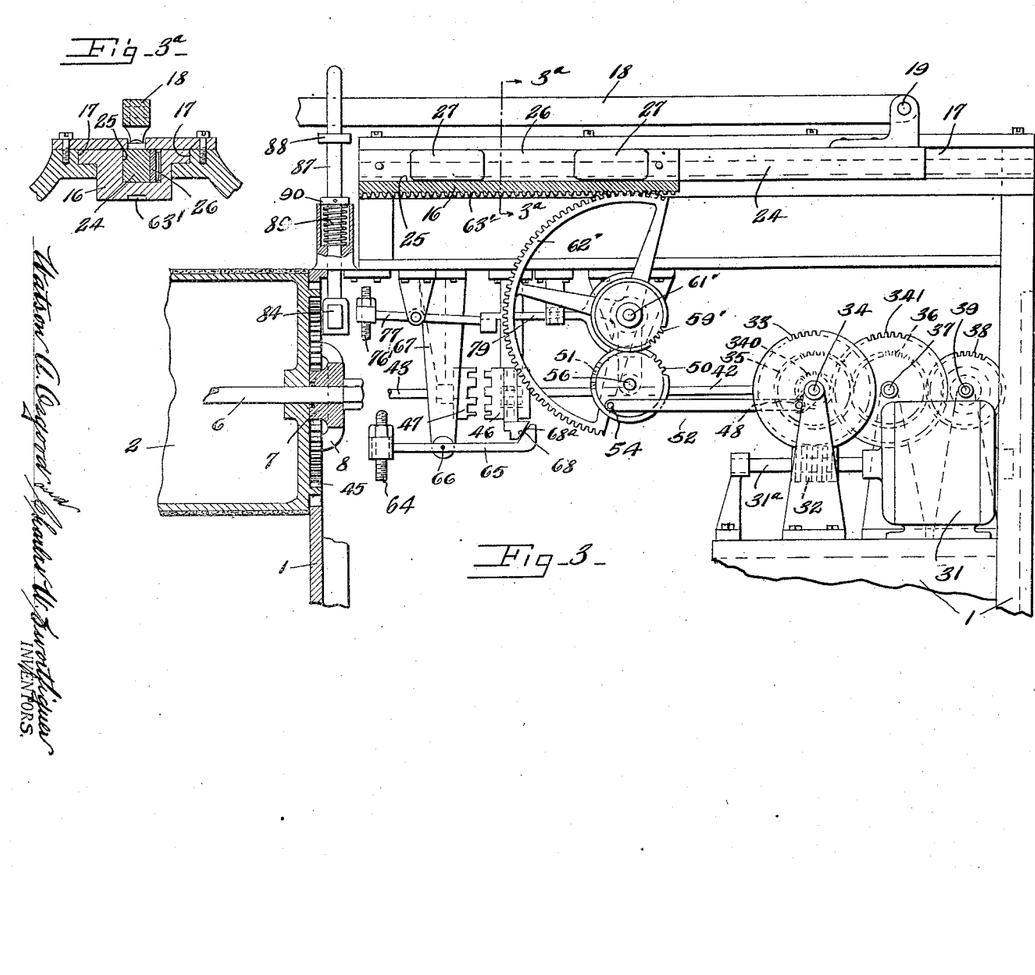

The drum 2 and carriage 16 are operated by a suitable actuator or prime mover and power transmitting connections between the prime mover and the drum and the carriage, and these connections are independently operable and controllable at will by operating members or levers. The connections between the prime mover and the carriage 16 are variable to change the length of the throw of the carriage 16 and the iron 15 whereby the iron can be actuated to travel the full length of the drum or ironing surface, or part of such length. As before described, the portion of the drum traveled by the iron during the short throw, can be regulated by shifting the slide 24 to which the arm or support 18 for the iron is connected, relatively to the carriage 16. In the illustrated embodiment of my invention, the prime mover is an electric motor 31, Fig. 3, the shaft 31ª of which is provided with a worm 32 meshing with the worm gear wheel 33 mounted upon the shaft 34, and this shaft is connected through suitable power transmitting mechanism to the rotating drum and to the carriage 16 to reciprocate the same.

As here illustrated, the power transmitting mechanism to the drum comprises a gear 340 mounted on the shaft 34 meshing with the gear 341 mounted on a shaft 37 and having a gear 36 thereon, the gear 36 meshing with a gear 38 mounted on a shaft 39, this shaft 39 having a bevel gear 40 meshing with the bevel gear 41 on a shaft 42 extending forwardly and being connected by suitable clutch mechanism to a shaft 43 in line with the shaft 42, the shaft 43 having a gear 44 at its front end meshing with the gear as an internal annular gear 45 on the rear end of the drum.

The clutch between the shafts 42 and 43 here illustrated comprises sections 46, 47, mounted respectively on the shafts 42, 43, the section 46 being shiftable axially into and out of engagement with the section 47. This clutch is actuated as will be hereinafter described.

Obviously, during the operation of the prime mover, the drum will be rotated.

The power transmitting means between the prime mover or the shaft 34 and the carriage 16 includes means by which the length of the throw of the carriage can be varied.

This motion transmitting means as here illustrated comprises a plurality of cranks 48, 49, Fig. 4, of different radii connected to the prime mover, oscillating members 50, 51, connectable by suitable clutches to the carriage 16, connecting rods 52, 53, connecting the crank 48 to the member 50 and the crank 49 to the member 51.

The distance between the wrist pin 54 and the shaft 56 is greater than the radial length of the crank 48 so that the rotary motion of the crank 48 is transferred into an oscillating motion to the member 50.

Also, the radial length of the wrist pin 55 connecting the rod 53 to the member 51 is greater than the radius of the crank 49, and this crank 49 is of less radial length than the crank 48 so that it imparts a shorter throw to the member 51 and the carriage 16 than the crank 48 imparts to the member 50 of the carriage 16.

The crank 48 is of sufficient length to impart a reciprocating movement to the carriage 16 to move the iron 15, the full length of the drum 2.

The crank 49 is long enough to impart a reciprocating movement to the iron of about one-half of the length of the drum.

The members 50 and 51 are here shown as gears mounted on a shaft 56 and connected thereto. These gears mesh with companion gears 59', 60', respectively mounted on a shaft 61' on which a segment 62' is mounted, said segment meshing with a rack 63' provided on the lower side of the carriage 16. The gears 59', 60' are connectible to and disconnectible from the shaft 61' by suitable clutches 57 and 58, which are operable as hereinafter described.

When the clutch 57 is connected to its companion gear 59', the carriage 16 is actuated through the segment 62' and rack 63' and the long throw is imparted to the carriage 16 and the iron 15.

When the clutch 58 is operated to connect the gear 60' to the shaft 61', the carriage 16 is actuated through the segment 62' and rack 63', and is given the short throw. By shifting the slide 24 relatively to the carriage 16, the iron 15 may be caused to travel during this short throw over any desired portion of the drum.

The cranks 48, 49, are here illustrated as mounted upon a shaft 342 and 37 respectively. The shaft 342 is here shown as arranged in line with the shaft 34 and as having a gear 35 thereon meshing with the gear 36 on the shaft 37. Owing to the arrangement of the trains of gears, the shaft 42 which actuates the drum 2 is operated when either crank 48 or 49 is effectively connected to the carriage 16.

Figures 5, 6:
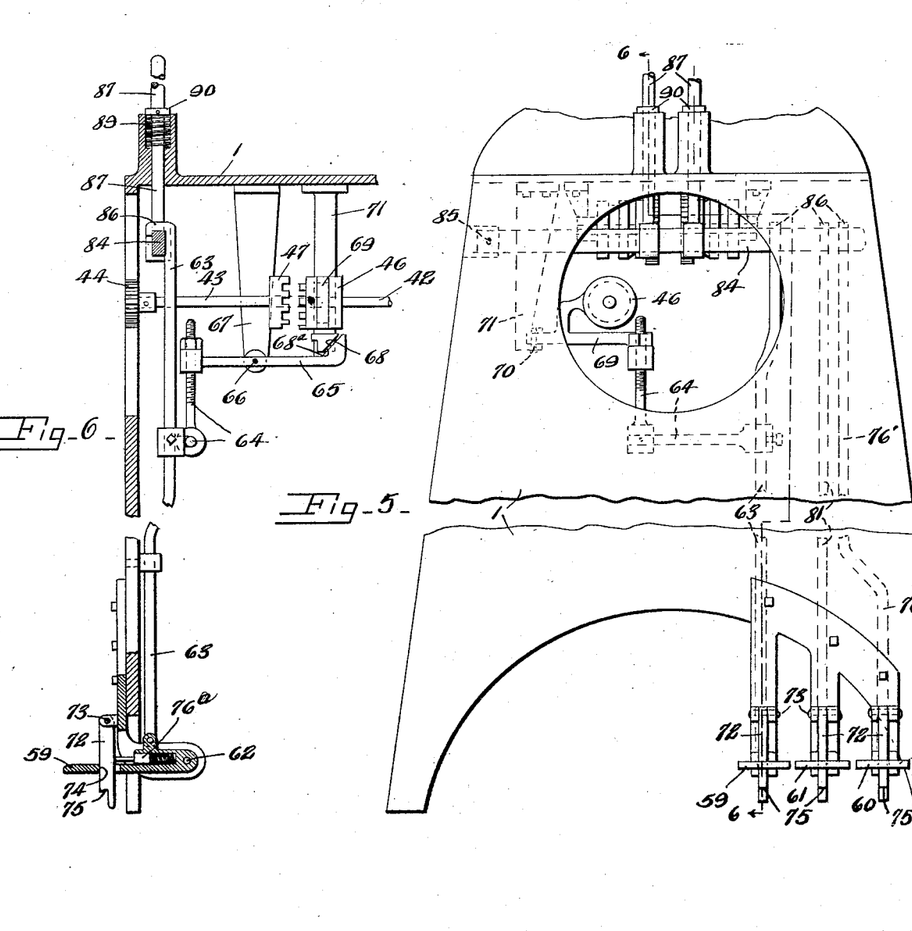
Figure 5 is an end elevation looking to the right in Fig. 1, the drum being omitted.
Figure 6 is a sectional view on line 6—6, Fig. 5.

The clutches 46, 57 and 58 are operated by suitable members as foot levers 59, 60 and 61, located at one side as the right hand side of the front end of the frame 1 as seen in Fig. 5, and the motion of these levers is transferred to the clutch sections in any suitable manner.

As here shown, the lever 59 is pivoted at 62 to the frame and is connected by a rod or link 63, Fig. 6, and an arm 64 projecting laterally from this link, to a lever 65, pivoted between its ends at 66 to a suitable support or hanger 67, this level having a cam or wedge surface 68 at one end, which coacts with the complemental cam surface 68$^a$ on one end of a shifter 69, Figs. 4 and 6, which shifter is pivoted or seated at 70 in the bracket 71, the shifter 69 being connected to the clutch section 46 on the shaft 42 to shift said section into and out of engagement with the clutch section 47 on the shaft 43. As the lever 59 is depressed, the cam surface 68$^a$ slides incline plane fashion along the face 68 and moves the shifter and the clutch section to the left into engagement with the face of the clutch section 47 on the shaft 43. The pedal 59 may be locked in this depressed position by a latch 72, Figs. 5 and 6, pivoted at 73 to the frame, the latch extending through a slot 74 in the pedal 59 and having a shoulder 75 in its lower end which latches on the top faces of the lever when the lever is depressed, the latch being pressed into its operative position by a spring pressed plunger 76$^a$ mounted in the lever 59. This latch is arranged so that it is moved automatically by its spring-pressed plunger 76$^a$ into locking position when the pedal is depressed and it can be moved whenever desired by the toe of the operator out of operative position. The pedals 60, 61, are similar to the pedal 59.

The clutch 57 is similarly operated by the lever 60 by a link 76' connected to a lever 77 similar to the lever 65 by an arm not shown but similar to the arm 64 on the rod 63, Figures 5 and 6 which lever 77 has cam faces 78 coacting with the shifting lever 79 connected to the clutch 57, which is here shown as a friction clutch operating with the clutch section or socket 80 on the gear 59'.

The pedal 61 is similarly connected by a rod 81 to a shifting lever 82 similar to the levers 65 and 79 by an arm not shown but similar to the arm 64 on the rod 63 and coacting with the clutch section 58 which is similar to the clutch section 57.

The links 63, 76' and 81, all cooperate with a universal bar 84 pivoted at 85 to the frame at one side thereof and extending transversely of the frame, each of the links having a hook-shaped coupling 86, Fig. 6, which permits downward movement of the bar by any one of the links 63, 76', 81 without moving the other links.

This bar 84 is connected to the arm 18 which carries the iron 15 and normally holds the iron in an inoperative position, or away from the drum 2 and upon depressing of any one of the pedals 59, 60, and 61, the iron will assume its operative position upon the drum. As here shown, the intermediate part of the bar 84 is connected to upwardly extending rods 87 having a coupling 88 across their upper ends, upon which the arm 18 rests, each rod being pressed upwardly by a spring 89 shouldering at one end on the frame and at its other end on a collar 90 on the rod 87.

This spring serves to return the pedals to their starting position.

Obviously, when any one of the pedals 59, 60, 61, is depressed the iron 15 will also be moved by its weight toward the clothes support or drum 2, owing to the fact that all of these pedals are connected to the universal bar 84.

In operation, when the clothes are placed on the drum and the pedal 59 depressed, thus operating the clutch section 46 so that it is engaged with the clutch 47, the motion is transmitted through the shaft 34 through the reduction gearing 340, 341, shaft 37, gear 36, gear 38, shaft 39, beveled gears 40, 41, shaft 42, clutch sections 46, 47, shaft 43, pinion 44 to the annular concentric gear 45 on the inner end of the drum. Upon depressing the pedal 60 the clutch 57 is operated to connect the gear 59' to the shaft 61' so that the carriage 16 is reciprocated by the long crank 48, the motion being transmitted from the shaft 34 through the reduction gear 340, 341, shaft 37, gears 36, 35, shaft 342, crank 48, connecting rod 52, gear 50, gear 59', shaft 61', segment 62', and rack 63'.

When it is desired to use the short throw, the pedal 61 is operated, thus operating the clutch section 58 to lock the gear 60' to the shaft 61' so that the motion is transmitted to the carriage 15 from the shaft 34, reduction gearing 340, 341, shaft 37, short crank 49, connecting rod 53, gear 51, gear 61', clutch 58, shaft 61', segment 62' and rack 63'.

In order to locate the iron on any particular part of the clothes support when the short throw is being used, the slide 24 on which the arm 18 carrying the iron 15 is mounted, is moved relatively to the carriage 16 by taking hold of the bracket 20 of the iron and applying sufficient force to overcome the friction between the friction shoe or plate 26 and the carriage 16.

When it is desired to use a sleeve or bosom board, the drum 2 may be swung out of operative position into the position shown in dotted lines, Fig. 2, by withdrawing the bolts 8ᵃ and swinging the drum and bracket 8 about the axis 9, this movement carrying the annular gear 45 on the drum out of mesh with the pinion 44.

The ironing board may then be mounted on the frame by placing the hooks 12 in the openings 13, Fig. 2. Upon movement of any of the pedals 59, 60, 61, the arm 18 moves downwardly and hence the iron 15 is brought down upon the clothes on the clothes support, owing to the fact that each of the links 63, 76' and 81 are connected to the universal bar 84, which universal bar is connected through the rod 87 to the arm 18.

The motor, motion transmitting mechanism, and the controls therefor are suitably supported on the frame by means of shelves, hangers, etc.

What we claim is:

1. In an ironing machine, the combination of a frame, a clothes support carried by the frame, an iron movable lengthwise of the support, a reciprocating slide, mechanism for reciprocating the slide, and frictional means for slidably holding the iron relative to the reciprocating slide to permit adjustment of the iron relative to the slide while the machine is operating.

2. An ironing machine comprising a frame, a clothes support carried by the frame, an iron movable lengthwise of the support, mechanism for reciprocating the iron comprising a driving member, a plurality of motion transmitting means between the driving member and the iron, and means for connecting one of said means to the driving member, at will, while the machine is in operation, substantially as and for the purpose set forth.

3. An ironing machine, the combination of a frame, a clothes support carried by the frame, an iron movable lengthwise of the support, a reciprocating carriage, a slide movable with said carriage, an arm mounted on the slide and supporting the iron, a friction connection between the slide and said carriage, operable to permit shifting of the slide along the carriage, mechanism for reciprocating the carriage, a driving member, a plurality of motion transmitting means between the driving member and the carriage for transmitting reciprocating movements of different lengths to the carriage, and means for connecting any one of such motion transmitting means, at will, to the slide while the driving member is in operation, substantially as and for the purpose specified.

4. An ironing machine comprising a frame, a clothes support carried by the frame, a reciprocating carriage, an iron support connected to the carriage and overhanging the clothes support, mechanism for reciprocating the carriage comprising a prime mover, cranks having different throws connected to the prime mover, motion transmitting means comprising connecting rods, and means for effectively connecting and disconnecting either of the cranks and its connecting rod to and from the carriage, substantially as and for the purpose set forth.

5. An ironing machine comprising a frame, a clothes support carried by the frame, a reciprocating carriage, an iron support connected to the carriage and overhanging the clothes support, mechanism for reciprocating the carriage comprising a prime mover, cranks having different throws associated with the prime mover, oscillating members paired with the cranks and connected to the carriage, rods connecting the cranks and said members whereby rotation of the cranks oscillates said members, and means for connecting and disconnecting either of said members to the carriage, substantially as and for the purpose described.

6. An ironing machine comprising a frame, a bracket pivoted to the frame, a rotatable clothes support carried by the bracket, and having a gear concentric therewith, means normally holding the bracket from pivotal movement, and actuating means for the drum comprising a gear meshing with the gear on the drum, said gears being arranged to separate upon movement of the bracket on its pivot out of its normal position, substantially as and for the purpose described.

In testimony whereof, we have hereunto signed our names at Syracuse, in the county of Onondaga, and State of New York, this 9th day of February, 1922.

WATSON A. OSGOOD.
CHAS. W. SWORTFIGUER.